United States Patent
Parks (10) Patent No.: US 12,360,722 B2
(45) Date of Patent: Jul. 15, 2025

(54) MANAGING DISPLAY DATA

(71) Applicant: DisplayLink (UK) Limited, Cambridge (GB)

(72) Inventor: Matthew Parks, Cambridge (GB)

(73) Assignee: DisplayLink (UK) Limited, Cambridge (GB)

( * ) Notice: Subject to any disclaimer, the term of this patent is extended or adjusted under 35 U.S.C. 154(b) by 0 days.

(21) Appl. No.: 17/337,264

(22) Filed: Jun. 2, 2021

(65) Prior Publication Data

US 2022/0012004 A1    Jan. 13, 2022

(30) Foreign Application Priority Data

Jun. 5, 2020  (GB) ..................... 2008534

(51) Int. Cl.
*G06F 3/14*  (2006.01)
*G06F 3/147*  (2006.01)
(Continued)

(52) U.S. Cl.
CPC ............ *G06F 3/1454* (2013.01); *G06F 3/147* (2013.01); *G06F 9/5011* (2013.01);
(Continued)

(58) Field of Classification Search
CPC .. G06F 21/32; G06F 2221/2113; G06F 15/16; G06F 3/012; G06F 3/013; G06F 3/12; G06F 3/1206; G06F 3/1222; G06F 3/1238; G06F 3/1244; G06F 3/1288; G06F 3/14; G06F 3/147; G09G 2320/0233

See application file for complete search history.

(56) References Cited

U.S. PATENT DOCUMENTS 9,639,714 B1 *   5/2017  Carlson ................ G06F 3/04886
2006/0136421 A1 * 6/2006  Muthukrishnan ....... H04L 67/02
(Continued)

FOREIGN PATENT DOCUMENTS

GB   2256940 A   6/2018
GB   2556940 A   6/2018

OTHER PUBLICATIONS

Great Britain Intellectual Property Office, "Search Report" in Application No. GB2008534.6, dated Dec. 8, 2020, 3 pages.

*Primary Examiner* — William Boddie
*Assistant Examiner* — Alecia D English
(74) *Attorney, Agent, or Firm* — Paradice & Li LLP (57) ABSTRACT

A method of healing an image in a display system having a host device and a display control device includes generating healing updates corresponding to a region of the image and generating other display data at the host device, allocating, by the host device or the display control device, at least a portion of a resource of the display system to be used at least preferentially for at least one of encoding, decoding, transmitting and/or storing the healing updates rather than the other display data, encoding the healing updates and the other display data at the host device, transmitting the encoded healing updates and the other encoded display data from the host device to the display control device, decoding the encoded healing updates and the other encoded display data at the display control device, and healing the image using the decoded healing updates at the display control device.

24 Claims, 10 Drawing Sheets

(51) Int. Cl.
   *G06F 9/50*     (2006.01)
   *G06F 13/10*    (2006.01)
   *G06F 13/20*    (2006.01)

(52) U.S. Cl.
   CPC ............ *G06F 13/105* (2013.01); *G06F 13/20* (2013.01); *G06F 2209/503* (2013.01); *G06F 2213/0062* (2013.01)

(56) References Cited

U.S. PATENT DOCUMENTS

| | | | | |
|---|---|---|---|---|
| 2006/0253685 A1* | 11/2006 | Wong | ................. | G06F 11/3423 |
| | | | | 712/25 |
| 2007/0091107 A1* | 4/2007 | Miyazawa | ............. | G03B 21/14 |
| | | | | 353/69 |
| 2011/0050747 A1* | 3/2011 | Ishii | ................. | G09G 3/3208 |
| | | | | 345/690 |
| 2012/0254703 A1* | 10/2012 | Rubin | .................... | H04L 1/201 |
| | | | | 714/784 |
| 2012/0256924 A1* | 10/2012 | Uema | ................... | G06F 3/1454 |
| | | | | 345/428 |
| 2014/0226901 A1 | 8/2014 | Spracklen et al. | | |
| 2015/0169443 A1* | 6/2015 | Lee | .................... | G06F 12/0246 |
| | | | | 711/103 |
| 2016/0125568 A1 | 5/2016 | Jeacocke | | |
| 2016/0127748 A1* | 5/2016 | Glazer | .................. | H04N 19/65 |
| | | | | 375/240.08 |
| 2016/0140702 A1 | 5/2016 | Kindle et al. | | |
| 2016/0196804 A1 | 7/2016 | Skinner et al. | | |
| 2017/0236252 A1* | 8/2017 | Nguyen | .................. | G06T 15/00 |
| | | | | 345/419 |
| 2019/0050664 A1* | 2/2019 | Yang | ...................... | G06F 3/012 |
| 2019/0102134 A1* | 4/2019 | Chen | ...................... | H04N 9/3147 |
| 2019/0121421 A1* | 4/2019 | Divakaran | ........... | H04N 19/426 |
| 2019/0130811 A1* | 5/2019 | Yonezawa | ............ | G09G 3/2092 |
| 2019/0172383 A1* | 6/2019 | Matsui | ................ | G09G 3/2003 |
| 2019/0206027 A1* | 7/2019 | Uemura | ............. | H04N 21/4402 |

\* cited by examiner

MANAGING DISPLAY DATA

CROSS-REFERENCE TO RELATED APPLICATIONS

This application claims priority to Great Britain Patent Application No. GB2008534.6, filed Jun. 5, 2020, which is hereby incorporated by reference in its entirety.

BACKGROUND

The present disclosure relates, generally, to managing display data. In a typical display system, an application running on a host device generates image data for display as an image frame on a display device. The data is encoded before transmission from the host device to a display controller that controls the display data to be displayed on a display. The data is decoded by the display controller before being forwarded for display. If a region of the image frame for display is not of sufficient quality, then display data corresponding to that region may be retransmitted by the host device. For example, an image frame may be divided into 'tiles' of display data corresponding to rectangular groups of pixels. During transmission, some of the tiles (or groups of tiles) may become lost or corrupted and the corresponding region of the image frame will not have the intended quality level. Alternatively, some of the display data may have been transmitted using a high level of compression due a limited bandwidth of a connection between the host device and the display controller, lowering the quality of display data received at the display control device. Therefore, in order to achieve the desired quality level, corresponding tiles of display data are encoded at a high (or higher) quality level at the host device and transmitted to the display control device in order to 'heal' the corresponding region of the image frame. The display controller receives and decodes the retransmitted display data and performs processing to generate an updated image frame. Display data transmitted in order to increase a quality level of a region of an image will hereinafter be referred to as a 'healing update'.

In display systems the available processing resources (such as the available processing power of the host device or the display controller), connection resources (such as the available bandwidth of a connection between the host device and the display controller) or memory resources may be limited. Healing updates may be transmitted using the same quality as for the originally transmitted data (for example, the same level of compression), or may alternatively be transmitted at higher quality. In either case, the processing and bandwidth resources required to encode, transmit, decode and display the healed display data may be significant and may result in a lower frame rate or stuttering of the image displayed at the display device. Therefore, there is a need to ensure that the generation and transmission of healing updates does not result in unacceptable processing loads or bandwidth requirements.

SUMMARY

Aspects of the present disclosure are set out in the independent claims and various embodiments are set out in the dependent claims.

In a first aspect the present disclosure provides a method of healing an image in a display system comprising a host device and a display control device, the method comprising: generating healing updates corresponding to a region of the image and generating other display data at the host device; allocating, by the host device or the display control device, at least a portion of a resource of the display system to be used at least preferentially for at least one of encoding, decoding, transmitting and/or storing the healing updates rather than the other display data; encoding the healing updates and the other display data at the host device; transmitting the encoded healing updates and the other encoded display data from the host device to the display control device; decoding the encoded healing updates and the other encoded display data at the display control device; and healing the image using the decoded healing updates at the display control device. The allocated resource may be used to encode, decode, transmit or store the healing updates but not the other display data.

The method may further comprise determining a usage level of the resource in the display system, wherein the resource is allocated based on the determined usage level of the resource in the display system. The allocation of the resource to be used at least preferentially for at least one of encoding, decoding, transmitting and/or storing the healing updates may be increased when the determined usage level of the resource decreases. The allocated resource may be a processing resource of the host device, and the method may comprise: determining a usage level of the processing resource at the host device; and determining the allocation of the processing resource to be used at least preferentially to encode the healing updates at the host device based on the usage level of the processing resource.

The allocated resource may be a bandwidth of a connection between the host device and the display control device, and the method may comprise: determining a usage level of the bandwidth of the connection between the host device and the display control device; and determining the allocation of the bandwidth to be used at least preferentially to transmit the healing updates from the host device to the display control device based on the usage level of the bandwidth.

The allocated resource may be a processing resource of the display control device, and the method may comprise: determining a usage level of the processing resource at the display control device; and determining the allocation of the processing resource of the display control device to be used at least preferentially to decode the healing updates at the display control device based on the usage level of the processing resource.

The allocated resource may be a transmission resource allocated for transmitting the healing updates, but not the other display data, from the host device to the display control device. The transmission resource may be a bandwidth of a connection between the host device and the display control device.

A USB endpoint or TCP socket of a connection used to transmit the healing updates from the host device to the display control device may be different to that of a connection used to transmit the other display data from the host device to the display control device.

The host device may determine whether a healing update is to be discarded at the host device. The host device may determine that the healing update is to be discarded based on an overlap of the region of the image to be healed and a region of the image for which display data more recent than the healing update has been generated. The healing update may be discarded without being encoded at the host device.

The display control device may determine whether a healing update is to be discarded at the display control device. The healing update may be discarded without being decoded at the display control device. The determination to discard the healing update may be based on display data generated at the host device after the healing update is generated at the host device; and the display data generated at the host device after the healing update is generated at the host device and the healing update may correspond to at least partially overlapping regions of the image.

The host device may encode a single healing update a plurality times to generate a plurality of encoded healing updates; a different level of compression may be applied to each of the encoded healing updates; and the host device may determine which of the encoded healing updates is to be transmitted to the display control device based on a usage level of a bandwidth of a connection between the host device and the display control device.

Separate buffers may be provided in the host device, in the display control device, or both, for storing encoded healing updates and other encoded display data, respectively.

The display control device may comprise separate buffers for storing encoded healing updates and other encoded display data, respectively; and the display control device may determine whether data received from the host device is a healing update or other display data and stores the received data in the corresponding buffer.

The display control device may determine whether an encoded healing update or other encoded display data is to be decoded next; and the determination of whether an encoded healing update or other encoded display data is to be decoded next may be based on a priority of an encoded healing update stored at the display control device, a usage level of a buffer of the display control device storing encoded healing updates, or a number of encoded healing updates stored at the display control device.

The priority of the healing update may correspond to an age of the healing update; and the age of the healing update may be a time since the healing update was generated at the host device, a time since the healing update was encoded at the host device, or a time since the healing update was received at the display control device.

The host device may reduce a quality level of the other display data to increase the resources allocated for encoding, decoding, transmitting or storing the healing updates. A lower quality level may correspond to a higher level of compression. The other display data may be encoded using a quality level corresponding to a predetermined target idle time of a processor of the host device. The healing updates may be encoded using the processor the host device during the idle time.

The allocation may be based on a number of healing updates stored at the host device that have not been encoded.

In a second aspect the present disclosure provides a host device in a display system comprising a display control device; wherein the host device is configured to perform the functions of the host device of the first aspect.

In a third aspect the present disclosure provides a display control device in a display system comprising a host device; wherein the display control device is configured to perform the functions of the display control device of the first aspect.

In a fourth aspect the present disclosure provides a system comprising: a non-transitory memory storing instructions; and one or more hardware processors coupled to the non-transitory memory and configured to execute the instructions from the non-transitory memory to cause the system to perform operations comprising: generating healing updates corresponding to a region of an image and generating other display data at a host device; allocating at least a portion of a resource of the system to be used at least preferentially for at least one of encoding, decoding, transmitting and/or storing the healing updates rather than the other display data; encoding the healing updates and the other display data at the host device; transmitting the encoded healing updates and the other encoded display data from the host device to a display control device; decoding the encoded healing updates and the other encoded display data at the display control device; and healing the image using the decoded healing updates at the display control device.

Beneficially, therefore, the present disclosure enables more efficient use of the available encoding, decoding and transmission resources in a display system.

BRIEF DESCRIPTION OF THE DRAWINGS

Embodiments will now be described, by way of example only and with reference to the accompanying drawings, in which.

DETAILED DESCRIPTION OF THE DRAWINGS

Figure 1:
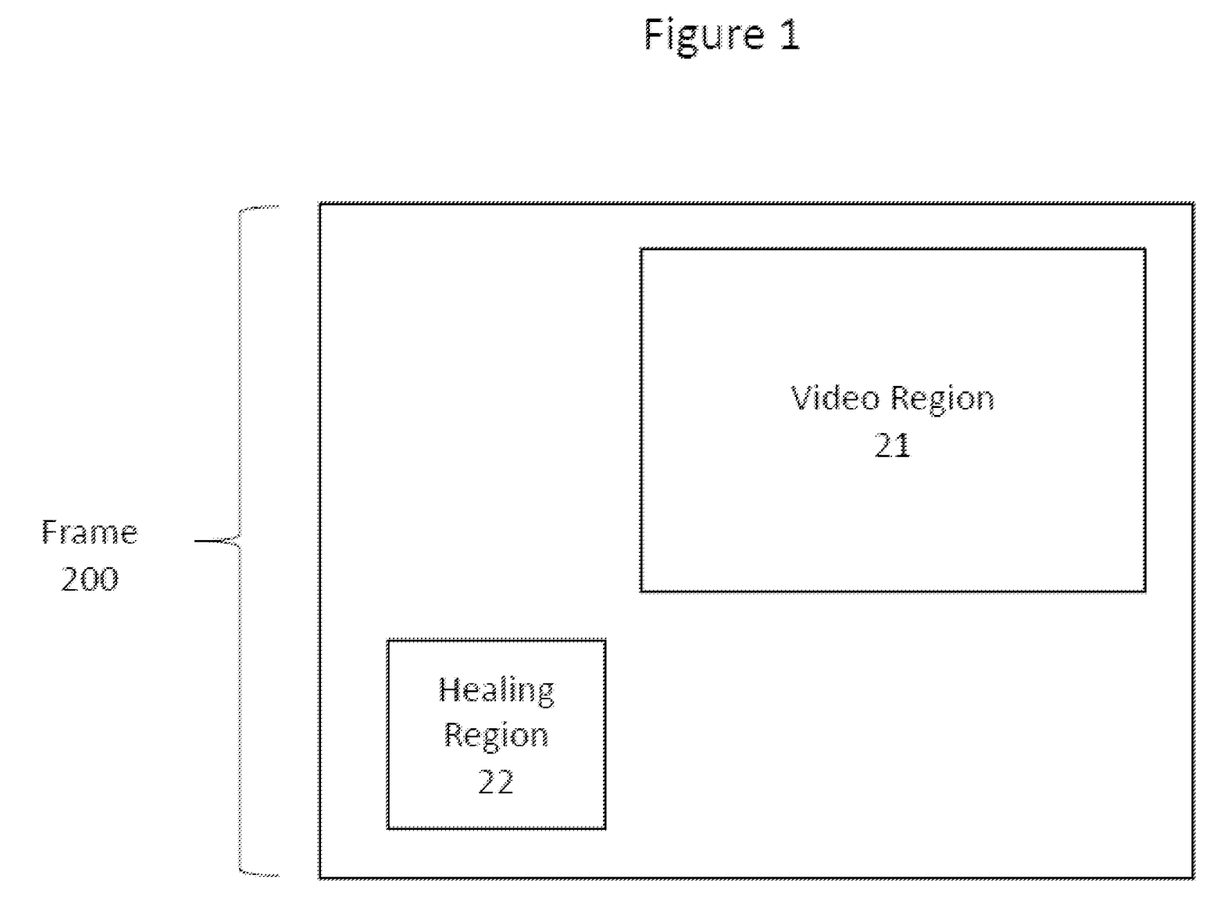
FIG. 1 shows a schematic illustration of a frame of display data.

FIG. 1 shows an example image frame [200] of display data for display at a display device. As can be seen in the Figure, the image frame [200] comprises a video region [21] and a healing region [22]. The video region is a region of the image frame [200] corresponding to display data of a video and the video region [21] must therefore be updated at least for each frame of the video. The healing region [22] is a region of the frame for which healing is required. The healing region [22] is originally encoded and transmitted at a first quality (for example, using a first level of compression), and a higher quality for that region is subsequently required. For example, when display data corresponding to the healing region [22] is first encoded and transmitted there may be insufficient processing and memory resources to encode and transmit the display data at the desired quality. Alternatively, display data corresponding to healing region [22] may have degraded in quality, or have been lost entirely, during transmission. Therefore, display data corresponding to the healing region [22] is re-encoded and re-transmitted at the desired quality for display at the display device. As will be discussed in more detail later, whilst in the example shown in FIG. 1 the healing region [22] and video region [21] do not overlap, it will be appreciated that the healing region [22] may overlap or partially overlap with the video region [21].

Display data for healing (i.e. improving a quality level) of a healing region [22] of an image frame will be referred to as a 'healing update' or 'healing display data'. Any other display data that is not a healing update (such as the initially transmitted display data corresponding to the region that is being healed, or the display data corresponding to the video region [21]) will be referred to as 'regular display data', 'other display data', or 'regular/other display updates' throughout this specification.

Figure 2:
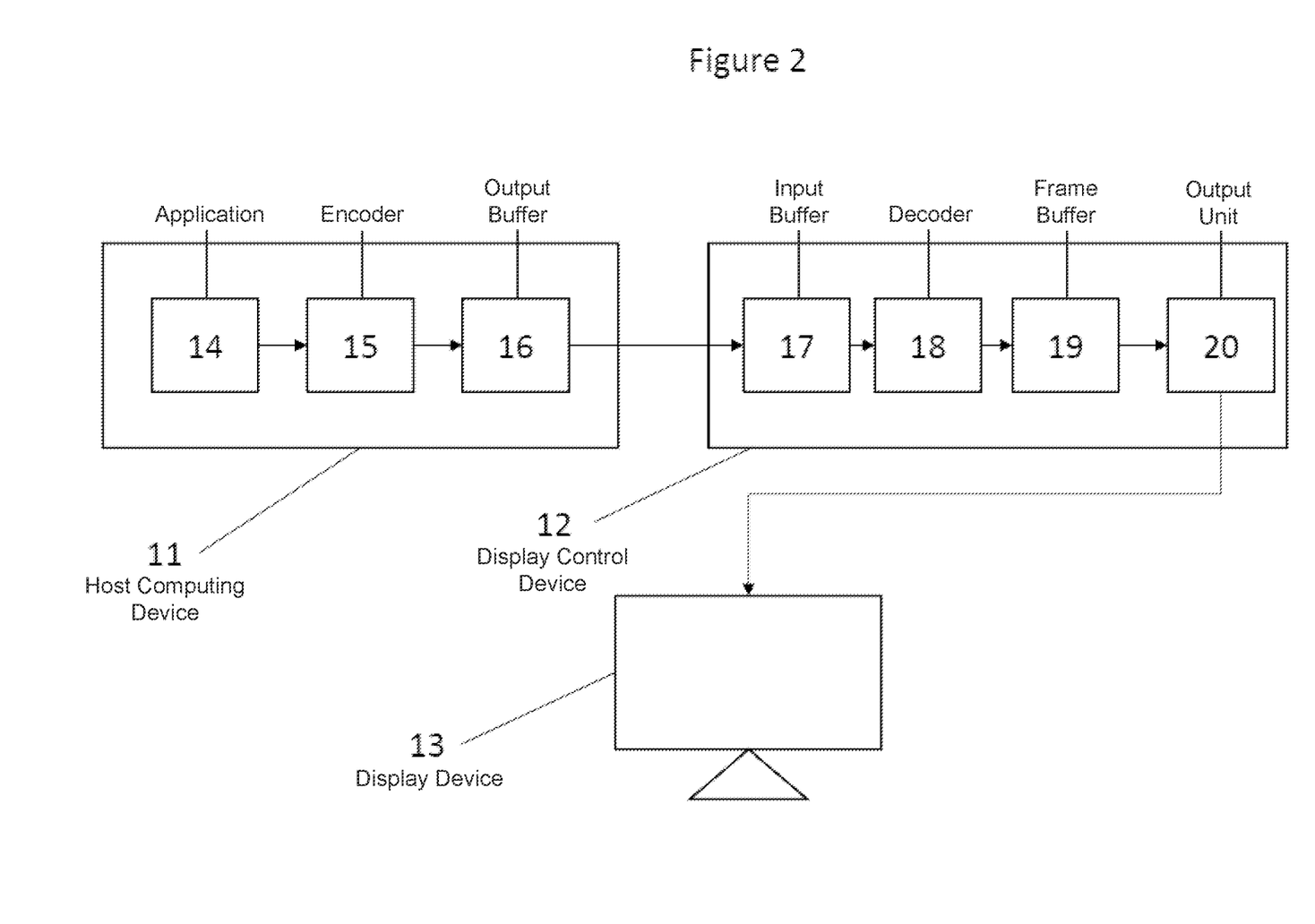
FIG. 2 shows a schematic overview of a display system.

FIG. 2 shows an overview of a display system in which the method of an embodiment of the invention could be used. In this example, the display system comprises a host computing device [11] which generates, encodes and transmits display data. The host device [11] transmits the encoded display data to a display control device [12] which decodes the received data and forwards a corresponding image frame to a display device [13]. Naturally, this is an example only, and the embodiments of the invention could be used in other contexts, including contexts where the data is transmitted within a single device or where data is received from or transmitted to multiple devices. Accordingly, the connections between the devices and between the components described in this Figure may be over any internal, local, or network interface. It will be appreciated that the display control device [12] may be a standalone unit, may be located at the host device [11], or may be located at the display device [13].

The host computing device [11] comprises an application [14] which generates display data. Whilst the application [14] is shown as a discrete hardware unit of the host computing device [11], it will be appreciated that the application [14] may in fact be software running on a general processor of the host device [11]. The generated display data includes regular display updates and healing updates. Display data generated by the application [14] is sent to an encoder [15]. The encoder [15] compresses the display data in preparation for transmission across a connection to the display control device [12]. The connection may be a bandwidth-limited connection. The encoder [15] may also encrypt the data or carry out any other processing required. The encoder [15] is connected to an output buffer [16] which stores the data prior to transmission. There may also be a buffer between the application [14] and the encoder [15], but it is not shown here.

The display control device [12] includes an input buffer [17] which stores data received from the host device [11]. A decoder [18] retrieves compressed display data from the input buffer [17] and reverses the processing carried out by the encoder [15], for example decompression. The decoder [18] is connected to a frame buffer [19] which stores the decoded data before it is sent to the display device [13] for display. Accordingly, the frame buffer [19] is connected to an output unit [20] which transmits the display data to the display device [13].

Figure 3:
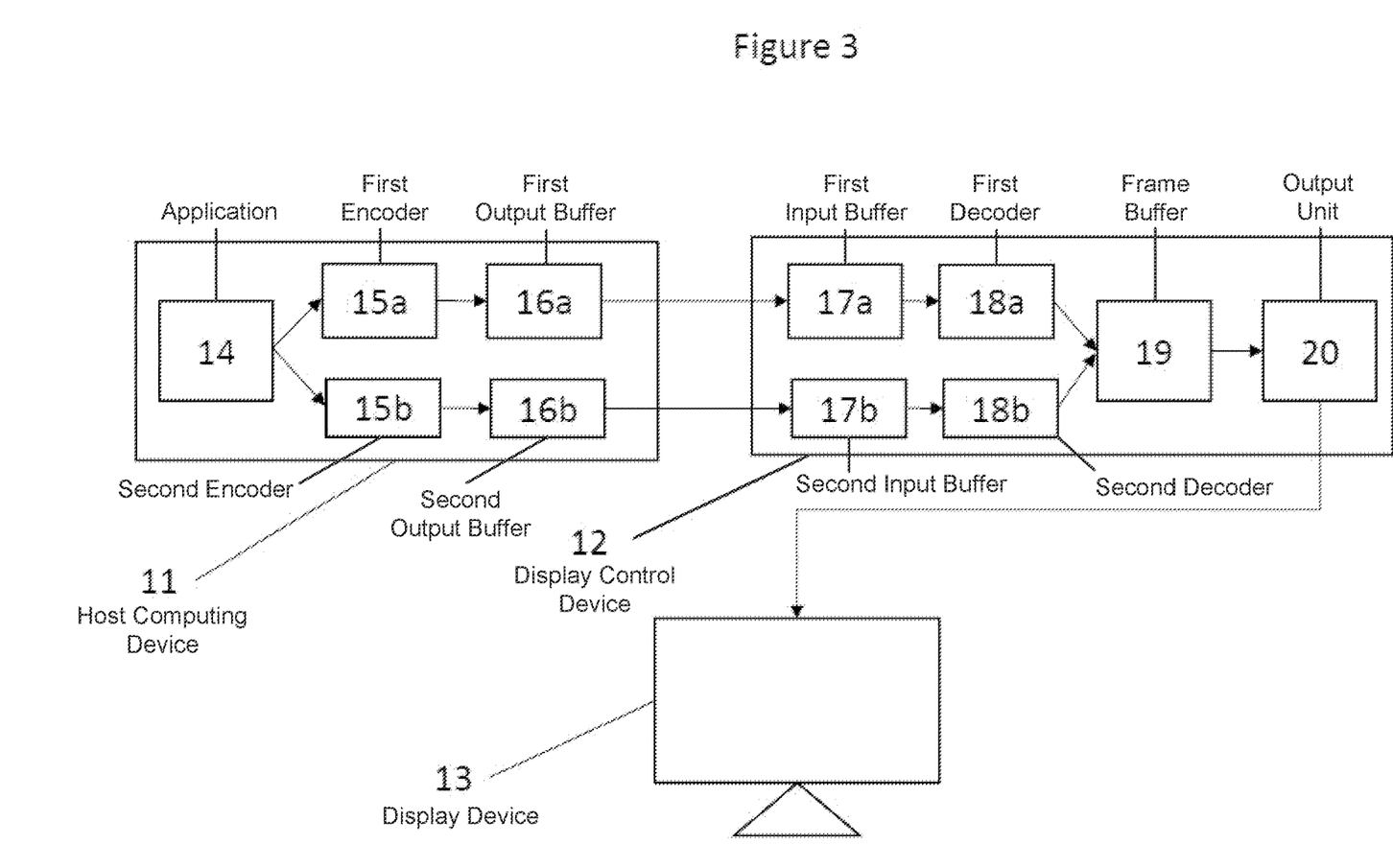
FIG. 3 shows a schematic overview of another display system.

FIG. 3 shows a modification of the system of FIG. 2, in which separate encoders [15a, 15b] and output buffers [16a, 16b] in the host device [11], input buffers [17a, 17b] in the display control device [12], and decoders [18a, 18b] are provided for healing updates and other display data, respectively.

In this example, a first encoder [15a] encodes regular display updates generated by the application [14] and a second encoder [15b] encodes healing updates. Beneficially, providing a separate encoder [15b] for healing updates allows the processing resources to be divided between the regular display updates and the healing updates more efficiently and in a more straightforward manner. For example, the encoding process of the second encoder [15b] may be assigned a lower priority than the encoding process of the first encoder [15a]. In one example, the host device [11] monitors the available processing, memory and/or transmission (e.g. bandwidth) resources and adjusts the priority of the process of encoding the healing updates based on the available resources.

As illustrated in the Figure, a first output buffer [16a] for regular display updates and a second output buffer [16b] for healing updates are provided in the host computing device [11]. The first output buffer [16a] receives encoded regular display data received from the first encoder [15a], before subsequent transmission of the display data to first input buffer [17a] in the display control device [12]. Similarly, the second output buffer [16b] stores encoded healing updates received from the second encoder [15b], before subsequent transmission of the encoded data to a second input buffer [17b] in the display control device [12]. The encoded display data stored in the first output buffer [16a] may be transmitted via a first transmission pathway (i.e. a connection configuration between the host device [11] and the display control device [12], such as a USB connection) to the display control device [12] and the encoded healing updates in the second output buffer [16b] may be transmitted via a second transmission pathway, different to the first transmission pathway, to the display control device [12]. For example, display data in the first output buffer [16a] may be transmitted using a different Transmission Control Protocol (TCP) socket or USB endpoint than that used to transmit the data in the second output buffer [16b]. As will be discussed in more detail later, providing separate buffers and transmission pathways for the regular display updates and the healing updates enables more precise control and prioritisation of the generation, storage and transmission of the display data.

The display control device [12] comprises a first decoder [18a] for decoding the encoded regular display updates stored in the first input buffer [17a], and a second decoder [18b] for decoding the encoded healing updates stored in the second input buffer [17b]. As will be discussed in more detail later, providing separate decoders [18a, 18b] in the display control device beneficially enables finer control of the allocation of processing resources of the display control device [12] between decoding regular display updates and decoding healing updates.

Encoding Healing Updates

In the host device [11] of the system of FIG. 2 or FIG. 3, display data corresponding to healing updates may be encoded at a different priority than for regular display data. For example, a process corresponding to encoding healing updates may be assigned a lower priority than a process of encoding regular display updates.

Figure 4:
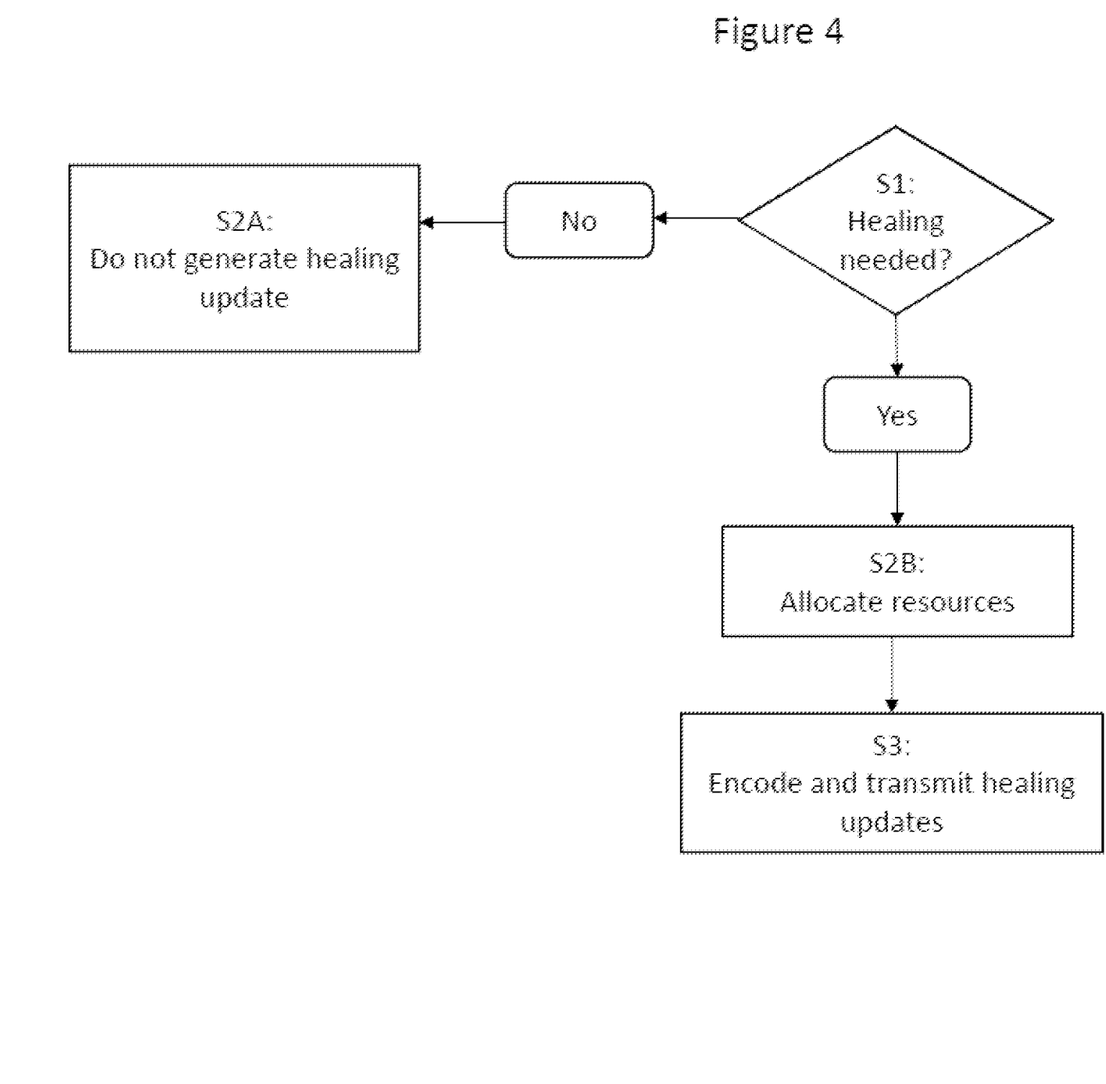
FIG. 4 shows a flow chart corresponding to a method of healing display data.

FIG. 4 shows a method of allocating resources for encoding and transmitting healing updates. In step S1, the host device [11] determines whether a healing update should be generated. For example, the host device [11] may determine that a portion of display data that was previously encoded and transmitted was not encoded or transmitted at a required quality level. For example, a portion of display data may have been transmitted using a high level of compression due to limited bandwidth between the host device [11] and the display control device [12]. Step S1 may be performed periodically or may be performed after each frame (or several frames) of display data has been transmitted to the display control device [12].

If healing is not required, the method proceeds to step S2A and the host device [11] does not generate a healing update.

If the host device [11] determines that healing is required, then the method proceeds to step S2B. In step S2B the host device [11] allocates resources for the generation, encoding and transmission of a healing update. The host device [11] may allocate the resources based on the processing and memory resources available at the host device [11] and based on the available transmission resources between the host device [11] and the display control device [12]. For example, the host device [11] may determine a usage level of a processing or transmission resource and may allocate a larger portion of the resource to processing or transmitting healing updates when the usage level is below a threshold value. The host device [11] may increase the amount of resources allocated to processing or transmitting healing updates as the overall usage level of the resource decreases.

In step S3 the host device [11] generates and encodes the healing update. The healing update is then transmitted from the host device [11] to the display control device [12].

It will be appreciated that whilst in the example shown in FIG. 4 the allocation of resources in step S2B is performed each time the host device determines that a healing update is required, this need not necessarily be the case. For example, the host device [11] may allocate resources to be used for a predetermined period of time, or for a predetermined number of frames or tiles of display data.

In one example, the host device [11] assigns a priority to a healing update and allocates the processing, memory and transmission resources based on the assigned priority. The host device [11] may determine the age of a healing update generated by an application [14] (e.g. the time elapsed since the healing update was generated by the application [14]) and the priority may be dependent on the age of the healing update. For example, the priority of encoding a healing update may increase as the age of the healing update increases and therefore the encoded healing update is more likely to arrive at the display control device [12] in time to heal a corresponding frame of display data.

It will be appreciated that healing updates and regular display updates can be encoded at various different quality levels by the host device [11]. For example, display data may be encoded using various levels of compression. In one example, the host device [11] uses a portion of the available processing resources to encode regular frames of display data at a predetermined quality level. The remaining processing resources can then be used to encode healing updates (for example, during idle time of a processor). In one particularly beneficial example, the predetermined quality is selected based on a target amount of processing resources to be made available for encoding healing updates. For example, the predetermined quality may be selected such that 10 percent of the processing resources of the host device [11] are available for encoding healing updates. In other words, the predetermined quality may be selected based on a target idle time of a processor of the host device [11]. It will be appreciated that the quality level may also be dynamically adjusted by the host device [11] based on the available processing and memory resources, based on the number of healing updates to be encoded and transmitted to the display control device [12], or based on a priority of a healing update stored and/or scheduled to be encoded at the host device [11]. Beneficially, control of the fraction of the processing resources used to encode healing updates ensures that the encoding of the regular display updates occurs at a sufficiently high rate, and therefore reduces the likelihood of the user perceiving stuttering of the images displayed at the display device [13]. In contrast, when healing updates and regular display updates are simply encoded by a single encoder in the order of generation by the application [14], the regular display updates may not be encoded at a sufficient rate when there are a large number of healing updates to be processed.

In one example, regular display data generated by the application [14] is stored in a first buffer and healing updates generated by the application are stored in a second buffer. The host device [11] determines the priority of encoding healing updates based on the memory usage level of the first and/or second buffers. For example, if the buffer used to store healing updates becomes full, the host device may determine to increase the priority of the process of encoding the healing updates. Similarly, if the buffer used to store the regular display updates generated by the application [14] becomes full, the host device [11] may determine to decrease the priority of encoding the healing updates.

Quality Levels of Display Data

In the example illustrated in FIG. 1, the image frame [200] of display data comprises a video region [21] and a healing region [22]. In a particularly beneficial example, the host device [11] may determine to reduce a quality level of the video region [21] so that the quality of the healing updates, or the number of healing updates, can be increased. For example, the host device [11] may determine to increase the amount of compression applied to display data corresponding to the video region [21].

Figure 5A:
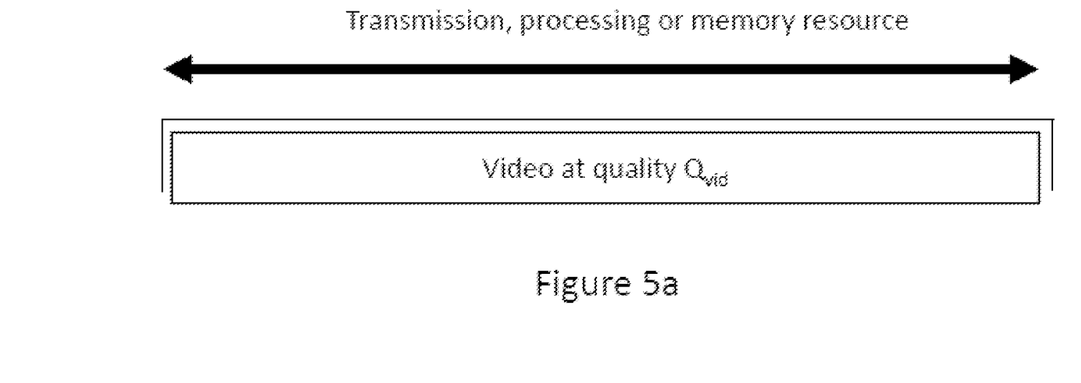
FIGS. 5a and 5b show schematic illustrations of usage of a resource in a display system.

FIG. 5a shows a schematic illustration of processing resource, memory resource or transmission resource (e.g. bandwidth) required to encode, decode or transmit the video region using a quality $Q_{vid}$.

Figure 5B:
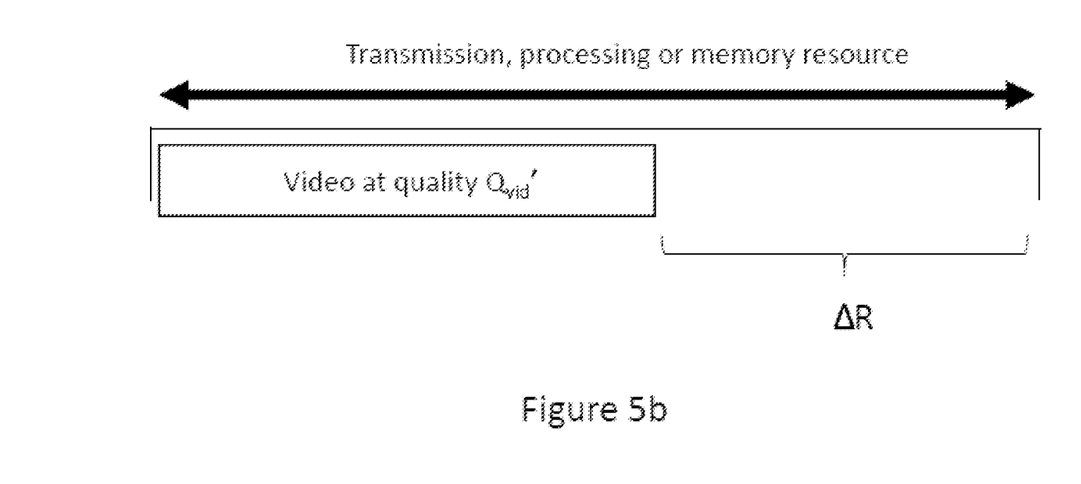

FIG. 5b shows a modification of FIG. 5a in which the video region is now generated using a quality $Q_{vid}'$ and as a result the resources indicated by $\Delta R$ are now available to be used for healing updates. In one example, the host device [11] may determine to reduce the quality of a video region based on the number of pending healing updates to be encoded and/or transmitted to the display control device [12]. Beneficially, therefore, reducing the quality of a video region [21] provides an additional mechanism for managing the resources of the display system available for processing and transmitting healing updates.

In one example, the host device [11] is configured to encode a single healing update multiple times using different levels of compression. The host device [11] then determines which of the encoded healing updates to transmit based on the available bandwidth of the connection between the host device [11] and the display control device [12].

Transmission of Healing Updates

Figure 6:
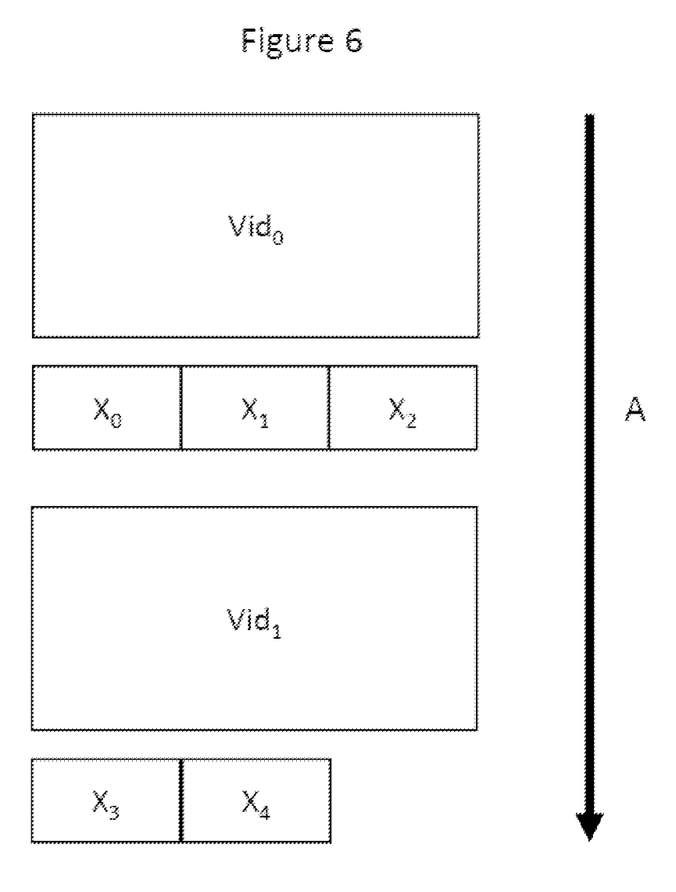
FIG. 6 is a schematic illustration showing transmission of display data.

FIG. 6 shows a first method transmitting healing updates and regular display data from a host device [11] to a display control device [12]. The method may be performed, for example, using the host device [11] illustrated in FIG. 2. $Vid_0$ and $Vid_1$ correspond to the video region [21] of FIG. 1 and represent two consecutive frames of the video region [21]. Healing updates $X_0$ to $X_4$ are also shown. It will be appreciated that a single healing region [22], such as the region illustrated in FIG. 1, may be divided into multiple tile groups, and that $X_0$ to $X_4$ may each represent a tile of display data. The term 'tile' is used to refer to a group of pixels of the image, for example a rectangular or square group of pixels. The host device [11] determines how many healing updates can be encoded and transmitted, and at what quality level the healing updates can be encoded and transmitted, based on the available processing, memory and/or transmission resources of the system. The display data is processed in the order indicated by arrow A. In this example, the host device [11] determines that there are sufficient resources to encode and transmit healing updates $X_0$, $X_1$ and $X_2$ following the encoding and transmission of frame $Vid_0$. Subsequently, the host device [11] determines that there are sufficient resources to encode and transmit healing updates $X_3$ and $X_4$ following the encoding and transmission of frame $Vid_1$. The encoding may be performed using a single thread of a processor of the host device [11] such that the processor completes the encoding of region $Vid_1$ before encoding the healing updates $X_0$, $X_1$ and $X_2$. The host device [11] may determine to reduce the quality (e.g. increase the level of compression) of the video region in order to encode and transmit a greater number of healing updates, or to transmit the healing updates using a higher quality level (e.g. lower level of compression) as described earlier in this specification.

Figure 7:
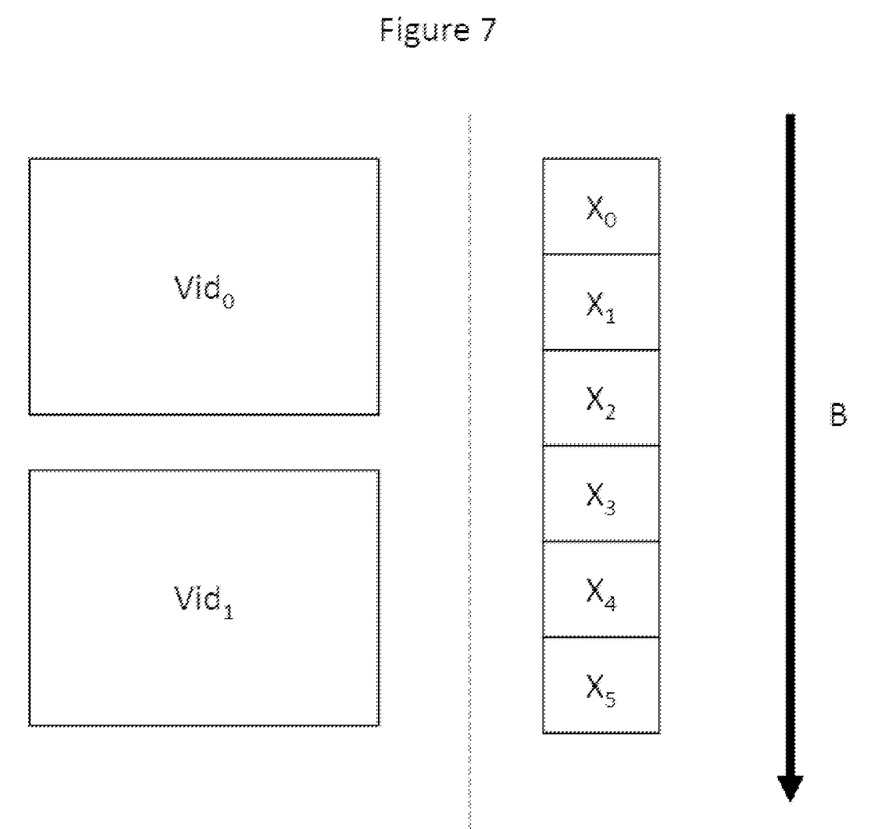
FIG. 7 shows another schematic illustration showing transmission of display data.

FIG. 7 shows an alternative method of encoding and transmitting healing updates and regular display data from a host device [11] to a display control device [12]. The method may be performed, for example, using the host device [11] illustrated in FIG. 3. In the method of FIG. 7 two threads of a processor of the host device [11] are utilised. The display data is processed in the order indicated by arrow B and the video updates $V_n$ and healing updates $X_n$ are encoded in parallel. For example, the first encoder [15a] of FIG. 3 (or a first thread) may be used to encode regular display updates and the second encoder [15b] of FIG. 3 (or a second thread) may be used to encode healing updates. Beneficially, when the encoding of the two types of display data is performed in separate threads, the host device [11] can assign a priority to each thread in order to manage the available processing resources of the host device [11].

The regular display updates and the healing display updates may be transmitted to the display control device [12] using separate transmission pathways, for example by using separate TCP sockets or USB endpoints, and may be stored in separate input buffers [17a, 17b] in the display control device [12]. As will be described in more detail below, storing the encoded healing updates and encoded regular display updates in separate buffers provides a particularly beneficial configuration for managing the processing and memory resources of the display control device [12].

Decoding Healing Updates

In addition to the processing and memory resources of the host device [11] being limited, it will be appreciated that the processing and memory resources of the display control device [12] may also be limited. Therefore, there is a need to manage the decoding of the regular display updates and the healing updates to ensure that display data is decoded by the display control device [12] and forwarded to the display device [13] in a timely manner, to prevent stuttering of the image or an undesirable reduction in the frame rate.

In the system of FIG. 2, the display control device [12] is provided with a single input buffer [17] for receiving encoded display data from the host device [11]. The decoder [18] decodes the data stored in the input buffer [17] and a resulting image frame is output to the frame buffer [19]. In one example, the decoder [18] may decode the display data stored in the input buffer [17] in the order in which the data was input into the input buffer [17]. In other words, the input buffer [17] may be operated in a first-in first-out (FIFO) manner.

Alternatively, as illustrated in FIG. 3, the display control device [12] may be provided with separate input buffers [17a, 17b] for healing updates and regular display updates, respectively. In this case, either a single decoder [18] or separate decoders [18a, 18b] may be provided for the healing updates and regular display updates.

When a single decoder [18] is provided, the display control device may determine whether to decode a healing update based on the available processing and memory resources at the display control device [12]. For example, the display control device [12] may determine a usage level of a processing or memory resource of the display control device [12] and may allocate a larger portion of a resource of the display control device [12] to decoding healing updates when the usage level is below a threshold value. The display control device [12] may increase the amount of resources allocated to processing healing updates as the overall usage level of a resource of the display control device [12] decreases.

In one example, the display control device [12] prioritises the decoding of the regular display data stored in the first input buffer [17a] and only decodes healing updates stored in the second input buffer [17b] during idle time of a processor. The display control device [12] may also, or instead, determine to decode a healing update based on a priority (for example, an age) of the healing update. For example, the display control device [12] may determine to decode a healing update when the time since the healing update was received at the display control device [12] exceeds a predetermined threshold value.

In one example, separate decoders [18a, 18b] are provided for the regular display updates and healing updates. Beneficially, the provision of separate decoders [18a, 18b] allows the decoding to be performed in parallel and allows the processing resources to be allocated between decoding the regular display updates and decoding the healing updates in a more straightforward manner. For example, a portion of the processing resources may be utilised by the first decoder [18a] and the remaining processing resources may be utilised by the second decoder [18b]. The display control device [12] may determine the allocation of the resources based on, for example, the amount of data stored in the first and/or second input buffers [17a, 17b] or based on the age (e.g. time elapsed since the display data was received at the display control device [12]) of display data stored in the first and/or second input buffers [17a, 17b].

Separate input buffers [17a, 17b] may be provided in the display control device [12] for the healing updates and regular display updates even when there is only a single output buffer [16] provided in the host device [11] (and a single corresponding transmission pathway between the host device [11] and the display control device [12]). In this case, the display control device [12] determines whether received display data corresponds to a healing update or regular display data and sorts the received data into the corresponding input buffer [17a, 17b]. However, providing separate output buffers [16a, 16b] in the host device [11] and separate transmission pathways as described above may be particularly beneficial, since this eliminates the need for sorting the display data at the display control device [12].

In one example, the host device [11] may transmit the same healing update multiple times, but encoded at different qualities (e.g. using different levels of compression), to the display control device [12]. Beneficially, the display control device [12] may determine which of the encoded healing updates to use based on, for example, the available processing resources at the display control device [12].

Obsolete Healing Updates

If a region of an image frame for which a healing update has been generated is altered before the healing update is applied, for example if the region now displays another frame of a video, then the healing update is no longer required. Therefore, there is a need to discard obsolete healing updates in an efficient manner, either at the host device [11] or at the display control device [12].

Figure 8:
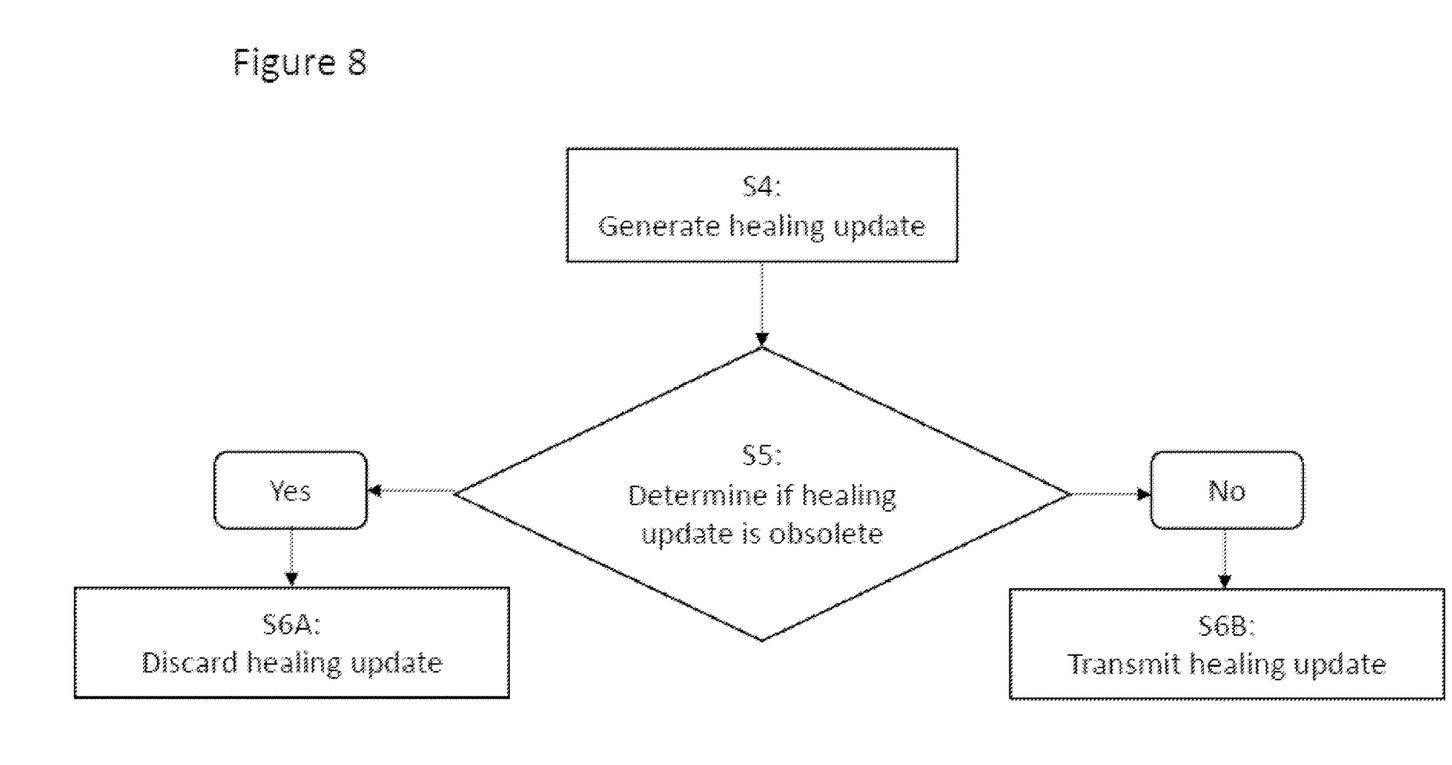
FIG. 8 shows a flow chart corresponding to a method of determining whether to discard a healing update at a host device.

FIG. 8 illustrates a method of determining whether to discard a healing update at the host device [11]. In step S4 a healing update is generated. In step S5, the host device [11] determines whether the healing update is obsolete (i.e. no longer needed). In one example, the host device [11] determines whether other display data corresponding to the region to be healed has also been generated. In the example shown in FIG. 1, if the video region [21] at least partially overlaps with the healing region [22] and new display data for the video region [21] has been generated after the healing update was generated, then the host device [11] determines that the healing update is obsolete and can be discarded.

If the host device [11] determines that the healing update is obsolete, then the method proceeds to step S6A and the healing update is discarded. It will be appreciated that the healing update need not necessarily be immediately deleted from the memory of the host device [11] but may merely be overwritten by subsequently generated display data.

If the host device [11] determines that the healing update is not obsolete, then the method proceeds to step S6B and the healing update is transmitted to the display control device [12].

Beneficially, discarding obsolete healing updates before the updates are transmitted to the display control device [12] reduces the amount of data stored in an output buffer [16] of the host device [11] and reduces the usage level of the bandwidth of the connection between the host device [11] and the display control device [12].

Figure 9:
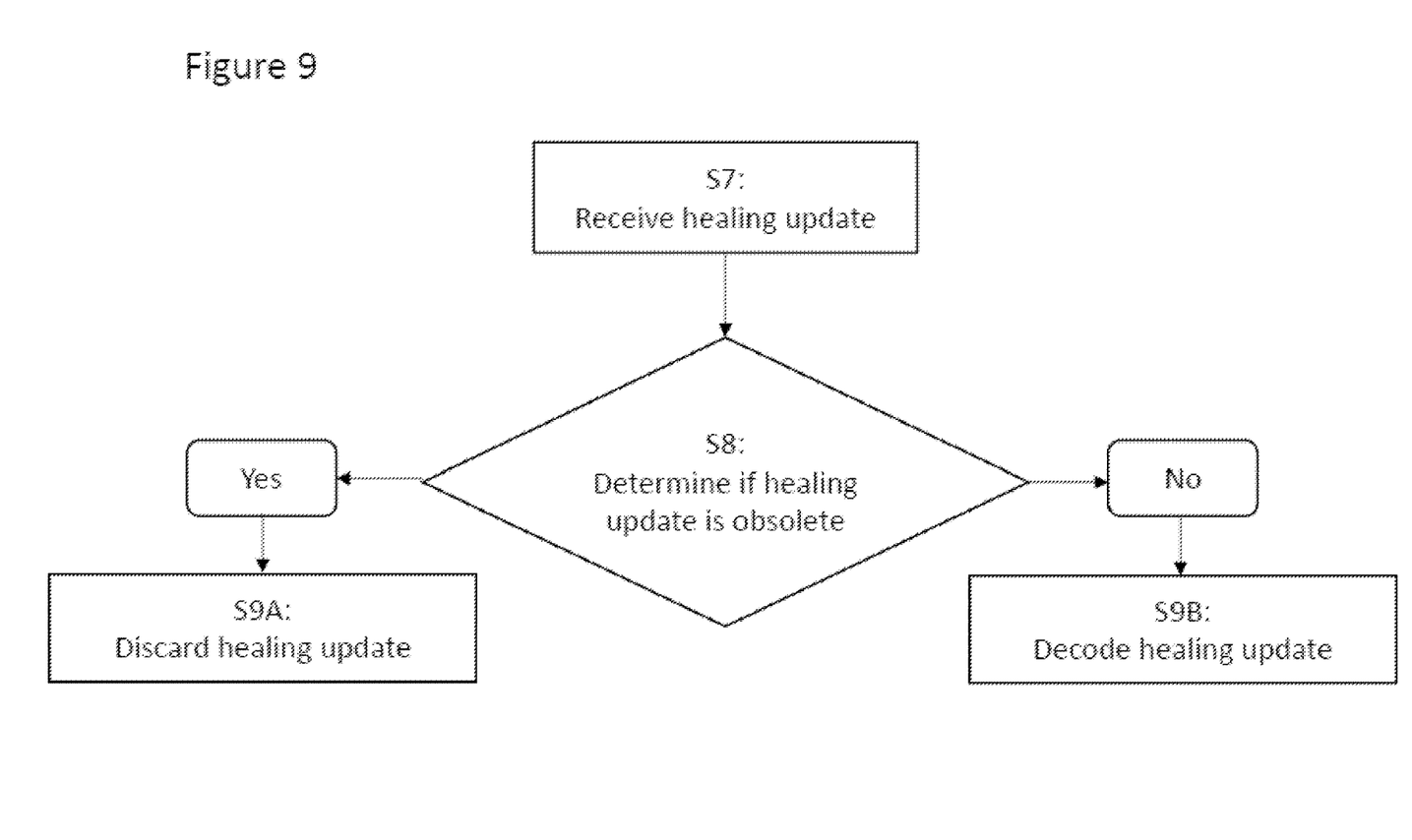
FIG. 9 shows a flow chart corresponding to a method of determining whether to discard a healing update at a display control device.

FIG. 9 illustrates a method of determining whether to discard a healing update at the display control device [12]. In step S7 the display control device [12] receives an encoded healing update from the host device [11].

In step S8, the display control device [12] determines whether the healing update is obsolete. For example, if the display control device [12] has received more recent display data corresponding to the region to be healed, then the display control device [12] determines that the healing update is obsolete.

If the display control device [12] determines that the healing update is obsolete, then the method proceeds to step S9A and the healing update is discarded. Beneficially, discarding obsolete encoded healing updates at the display control device [12] reduces the amount of memory required to store the received healing updates. Moreover, since the discarded updates no longer need to be decoded, the processing load at the display control device [12] is reduced.

If the display control device [12] determines that the healing update is not obsolete, then the method proceeds to step S9B and the healing update is decoded.

Figure 10:
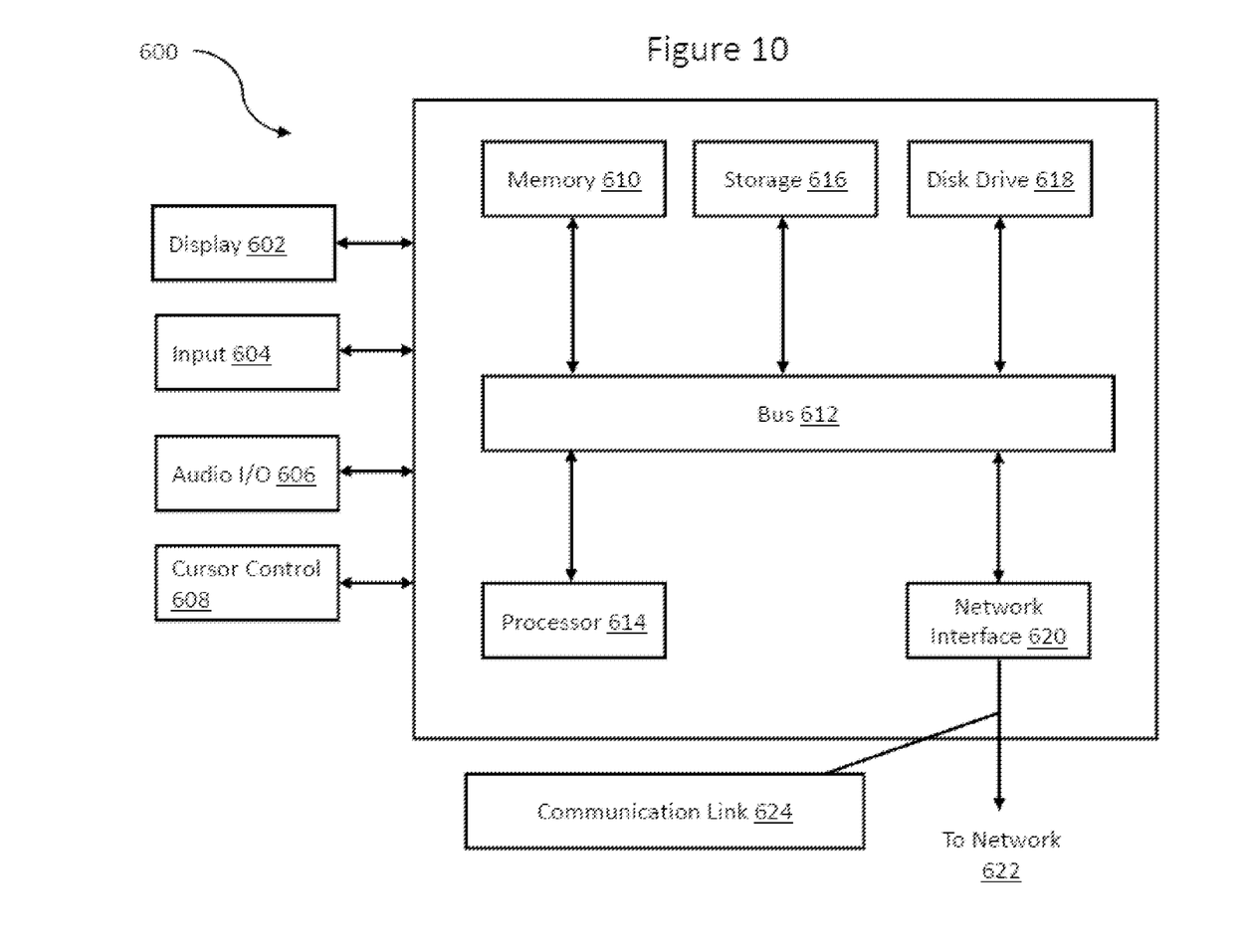
FIG. 10 shows a block diagram of a computer system.

FIG. 10 is a block diagram of a computer system [600] suitable for implementing one or more embodiments of the present disclosure, including the host device [11], or the display control device [12]. In various implementations, the host device [11] may include a mobile cellular phone, personal computer (PC), laptop, wearable computing device, etc. adapted for wired or wireless communication, and each of the host device [11] and the display control device [12] may include a network computing device. Thus, it should be appreciated that these devices [11, 12] may be implemented as the computer system [600] in a manner as follows.

The computer system [600] includes a bus [612] or other communication mechanism for communicating information data, signals, and information between various components of the computer system [600]. The components include an input/output (I/O) component [604] that processes a user action, such as selecting keys from a keypad/keyboard, selecting one or more buttons or links, etc., and sends a corresponding signal to the bus [612]. The I/O component [604] may also include an output component, such as a display [602] and a cursor control [608] (such as a keyboard, keypad, mouse, etc.). An optional audio input/output component [606] may also be included to allow a user to use voice for inputting information by converting audio signals. The audio I/O component [606] may allow the user to hear audio. A transceiver or network interface [620] transmits and receives signals between the computer system [600] and other devices via network [622]. In one embodiment, the transmission is wireless, although other transmission mediums and methods may also be suitable. A processor [614], which can be a micro-controller, digital signal processor (DSP), or other processing component, processes these various signals, such as for display on the computer system [600] or transmission to other devices via a communication link [624]. The processor [614] may also control transmission of information, such as cookies or IP addresses, to other devices.

The components of the computer system [600] also include a system memory component [610] (e.g., RAM), a static storage component [616] (e.g., ROM), and/or a disk drive [618] (e.g., a solid-state drive, a hard drive). The computer system [600] performs specific operations by the processor [614] and other components by executing one or more sequences of instructions contained in the system memory component [610]. For example, the processor [614] could be utilised to perform the functions of the application [14] or encoder [15] of the host device [11].

Executable logic for performing any described functions may be encoded in a computer readable medium, which may refer to any medium that participates in providing instructions to the processor [614] for execution. Such a medium may take many forms, including but not limited to, non-volatile media, volatile media, and transmission media. In various implementations, non-volatile media includes optical or magnetic disks, volatile media includes dynamic memory, such as the system memory component [610], and transmission media includes coaxial cables, copper wire, and fiber optics, including wires that comprise the bus [612]. In one embodiment, the logic is encoded in non-transitory computer readable medium, such as a magnetic or optical disk or other magnetic/optical storage medium, or FLASH or other solid-state memory (e.g. integrated into a device or in the form of a memory card). In one example, transmission media may take the form of acoustic or light waves, such as those generated during radio wave, optical, and infrared data communications.

In various embodiments of the present disclosure, execution of instruction sequences to practice the present disclosure may be performed by the computer system [600]. In various other embodiments of the present disclosure, a plurality of computer systems [600] coupled by the communication link [624] to the network (e.g., such as a LAN, WLAN, PTSN, and/or various other wired or wireless networks, including telecommunications, mobile, and cellular phone networks) may perform instruction sequences to practice the present disclosure in coordination with one another.

The above embodiments and examples are to be understood as illustrative examples. Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

The invention claimed is:

1. A method of healing an image in a display system comprising a host device and a display control device, the method comprising:
generating regular display data representing transmissions of display data associated with one or more first regions of the image;
generating healing updates different than the regular display data, representing subsequent updates to previously transmitted display data associated with one or more second regions of the image, wherein the subsequent updates succeed the previously transmitted display data and are configured to increase a quality level of the one or more second regions;
allocating a first resource for transmitting the regular display data, wherein the first resource is associated with the host device;
determining a usage level of the first resource;
reallocating at least a portion of the first resource to be used for transmitting the healing updates, rather than the regular display data, based on the determined usage level of the first resource;
determining whether a healing update is to be discarded at the host device, wherein determining that the healing update is to be discarded is based on an overlap of at least one of the second regions of the image and a region of the image for which the regular display data has been generated more recently than the healing update;
encoding the healing updates and the regular display data at the host device; and
transmitting the encoded healing updates and the encoded regular display data from the host device to the display control device.

2. The method of claim 1, wherein the reallocation of the first resource to be used for transmitting the healing updates is increased when the determined usage level of the first resource decreases.

3. The method of claim 1, wherein the first resource is a bandwidth of a connection between the host device and the display control device, and the method comprises:
determining a usage level of the bandwidth of the connection between the host device and the display control device; and
determining the reallocation of the bandwidth to be used to transmit the healing updates from the host device to the display control device based on the usage level of the bandwidth.

4. The method of claim 1, further comprising:
determining a usage level of a second resource associated with the display control device;
allocating the second resource to be used to decode the healing updates at the display control device based on the determined usage level of the second resource;
decoding the encoded healing updates and the encoded regular display data; and
healing the image using the decoded healing updates.

5. The method of claim 1, wherein the first resource is a transmission resource reallocated for transmitting the healing updates, but not the regular display data, from the host device to the display control device.

6. The method of claim 5, wherein the transmission resource is a bandwidth of a connection between the host device and the display control device.

7. The method of claim 1, wherein a USB endpoint or TCP socket of a connection used to transmit the healing updates from the host device to the display control device is different to that of a connection used to transmit the regular display data from the host device to the display control device.

8. The method of claim 1, wherein the healing update is discarded without being encoded at the host device.

9. The method of claim 1, wherein the display control device determines whether a healing update is to be discarded at the display control device.

10. The method of claim 9, wherein the healing update is discarded without being decoded at the display control device.

11. The method of claim 9, wherein the determination to discard the healing update is based on a regular display data generated at the host device after the healing update is generated at the host device; and
the regular display data generated at the host device after the healing update is generated at the host device and the healing update correspond to at least partially overlapping regions of the image.

12. The method of claim 1, wherein the host device encodes a single healing update a plurality of times to generate a plurality of encoded healing updates;
wherein a different level of compression is applied to each of the encoded healing updates; and
wherein the host device determines which of the encoded healing updates is to be transmitted to the display control device based on a usage level of a bandwidth of a connection between the host device and the display control device.

13. The method of claim 1, wherein separate buffers are provided in the host device, in the display control device, or both, for storing encoded healing updates and encoded regular display data, respectively.

14. The method of claim 13, wherein the display control device comprises separate buffers for storing encoded healing updates and encoded regular display data, respectively; and wherein the display control device determines whether data received from the host device is a healing update or regular display data and stores the received data in a corresponding buffer.

15. The method of claim 1, wherein the display control device determines whether an encoded healing update or encoded regular display data is to be decoded next; and wherein the determination of whether an encoded healing update or encoded regular display data is to be decoded next is based on a priority of an encoded healing update stored at the display control device, a usage level of a buffer of the display control device storing encoded healing updates, or a number of encoded healing updates stored at the display control device.

16. The method of claim 15, wherein the priority of the healing update corresponds to an age of the healing update; and wherein the age of the healing update is a time since the healing update was generated at the host device, a time since the healing update was encoded at the host device, or a time since the healing update was received at the display control device.

17. The method of claim 1, wherein the host device reduces a quality level of the regular display data to increase the first resource reallocated for transmitting the healing updates.

18. The method of claim 17, wherein a lower quality level corresponds to a higher level of compression.

19. The method of claim 1, wherein the regular display data are encoded using a quality level corresponding to a predetermined target idle time of a processor of the host device.

20. The method of claim 19, wherein the healing updates are encoded using the processor of the host device during the idle time.

21. The method of claim 1, wherein the reallocation is based on a number of healing updates stored at the host device that have not been encoded.

22. A display system comprising:
a display control device; and
a host device, wherein the host device is configured to:
generate regular display data representing transmissions of display data associated with one or more first regions of an image;
generate healing updates different than the regular display updates, the healing updates representing subsequent updates to previously transmitted display data associated with one or more second regions of the image, wherein the subsequent updates succeed the previously transmitted display data and are configured to increase a quality level of the one or more second regions;
allocate a first resource for transmitting the regular display data, wherein the first resource is associated with the host device;
determine a usage level of the first resource;
reallocate at least a portion of the first resource to be used for transmitting the healing updates, rather than the regular display data, based on the determined usage level of the first resource;
determine whether a healing update is to be discarded at the host device, wherein determining that the healing update is to be discarded is based on an overlap of at least one of the second regions of the image and a region of the image for which the regular display data has been generated more recently than the healing update;
encode the healing updates and the regular display data; and
transmit the encoded healing updates and the encoded regular display data to the display control device.

23. The display system of claim 22, wherein the display control device is configured to:
decode the encoded healing updates and the encoded regular display data; and
heal the image using the decoded healing updates.

24. A system comprising:
a non-transitory memory storing instructions; and
one or more hardware processors coupled to the non-transitory memory and configured to execute the instructions from the non-transitory memory to cause the system to perform operations comprising:
generating regular display data representing transmissions of display data associated with one or more first regions of an image;
generating healing updates different than the regular display data, representing subsequent updates to previously transmitted display data associated with one or more second regions of the image, wherein the healing updates succeed the previously transmitted display data and are configured to increase a quality level of the one or more second regions;
allocating a first resource for transmitting the regular display data, wherein the first resource is associated with a host device associated with the system;
determining a usage level of the first resource;
reallocating at least a portion of the first resource to be used for transmitting the healing updates, rather than the regular display data, based on the determined usage level of the first resource;
determining whether a healing update is to be discarded at the host device, wherein determining that the healing update is to be discarded is based on an overlap of at least one of the second regions of the image and a region of the image for which the regular display data has been generated more recently than the healing update;
encoding the healing updates and the regular display data at the host device; and
transmitting the encoded healing updates and the encoded regular display data from the host device to a display control device.

* * * * *